United States Patent
Jung

[11] Patent Number: 5,905,796
[45] Date of Patent: May 18, 1999

[54] HINGE MECHANISM FOR FOLDABLE ELECTRONIC APPARATUS

[75] Inventor: Jong-Gab Jung, Kyoungki-do, Rep. of Korea

[73] Assignee: SamSung Electronics Co., Ltd., Suwon, Rep. of Korea

[21] Appl. No.: 08/853,911

[22] Filed: May 9, 1997

Related U.S. Application Data

[63] Continuation-in-part of application No. 08/708,985, Sep. 6, 1996, Pat. No. 5,697,124.

[30] Foreign Application Priority Data

Sep. 19, 1995 [KR] Rep. of Korea ..................... 95/25322
Apr. 24, 1996 [KR] Rep. of Korea ..................... 96/9131

[51] Int. Cl.⁶ ................................................. H04M 1/00
[52] U.S. Cl. .......................................... 379/433; 379/434
[58] Field of Search ...................................... 379/433, 428, 379/434; 455/90, 128, 351; 16/341, 344, 329, 303, 328, 330

[56] References Cited

U.S. PATENT DOCUMENTS

| | | |
|---|---|---|
| 514,890 | 2/1894 | Heilmann . |
| 2,146,391 | 2/1939 | Anderson . |
| 3,026,559 | 3/1962 | Benham . |
| 3,353,206 | 11/1967 | Kerman . |
| 3,518,716 | 7/1970 | Larson . |
| 4,897,873 | 1/1990 | Beutler et al. . |
| 5,031,270 | 7/1991 | Lee . |
| 5,109,572 | 5/1992 | Park . |
| 5,111,503 | 5/1992 | Takagi . |
| 5,125,131 | 6/1992 | Leblanc . |
| 5,185,790 | 2/1993 | Mischneko . |
| 5,274,882 | 1/1994 | Persson . |
| 5,303,291 | 4/1994 | Takagi et al. . |
| 5,317,785 | 6/1994 | Kobayashi . |
| 5,732,331 | 3/1998 | Harms ..................................... 379/433 |

*Primary Examiner*—Jack Chiang
*Attorney, Agent, or Firm*—Robert E. Bushnell, Esq.

[57] ABSTRACT

A housing of an electronic apparatus including a flip-cover opening/closing device which includes: rotation portions positioned in an outward direction of the housing, the rotation portions being detached from the housing upon rotating a flip-cover over a communication angle and applying a force; a pair of necks for converting a rotational movement of the flip-cover into a rectilinear movement upon rotation of the flip-cover over the communication angle, so as to detach a hooking socket of the flip-cover from a hinge shaft of the housing; and at least one tension opening for absorbing the force applied to the hooking socket of the flip-cover upon the detachment of the hooking socket; the flip-cover being detachable from the housing. The rotation portions may include a space disposed therebetween for reducing the force on the hooking groove caused when detaching the rotation portions from the hooking socket. At least one supportable rib may be provided between the rotation portions and the hooking socket for preventing variation of the hooking socket caused upon detaching the flip-cover.

16 Claims, 8 Drawing Sheets

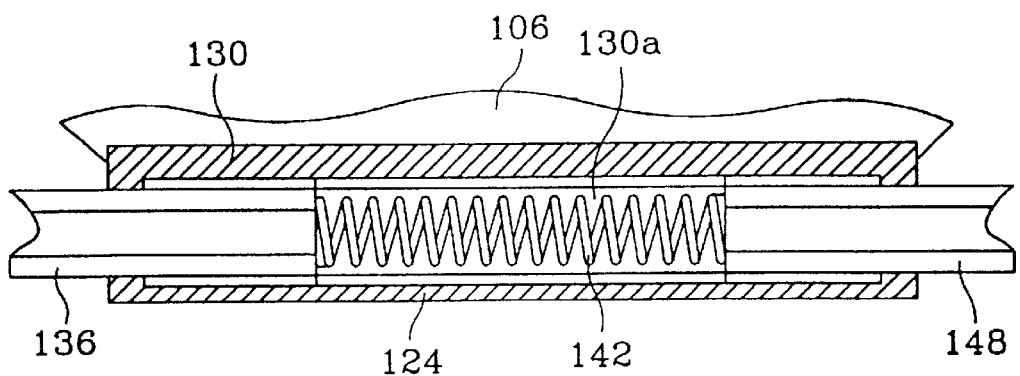
Fig. 3 *(Prior Art)*
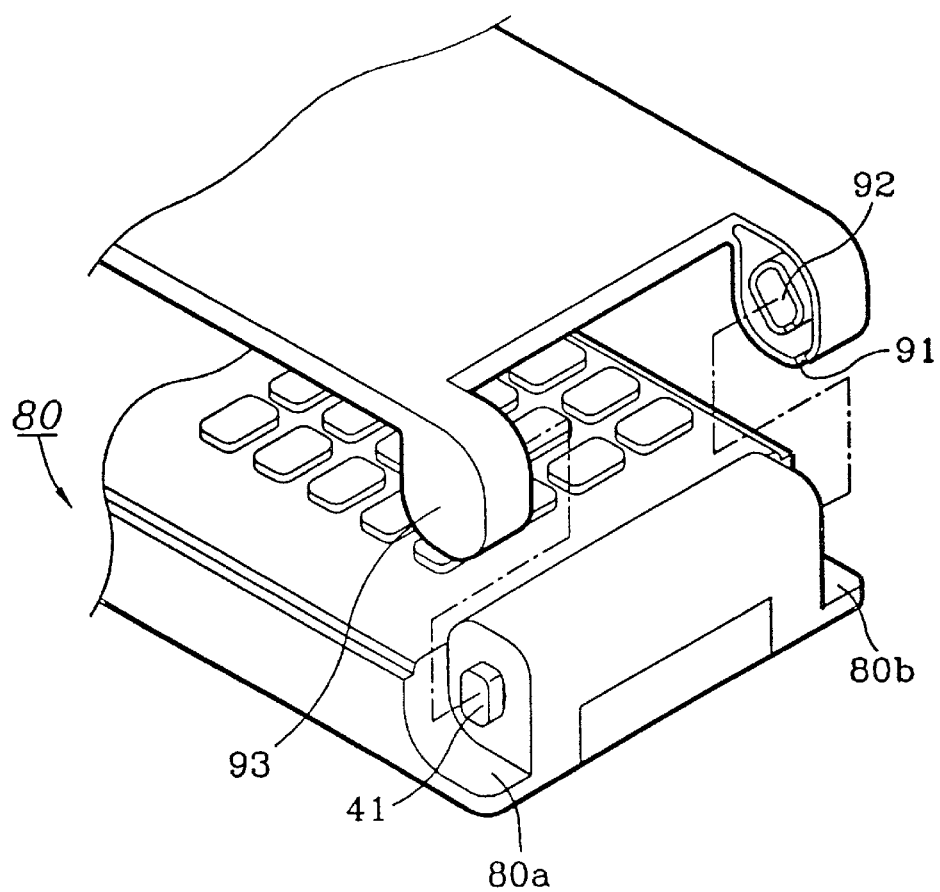
Fig. 4

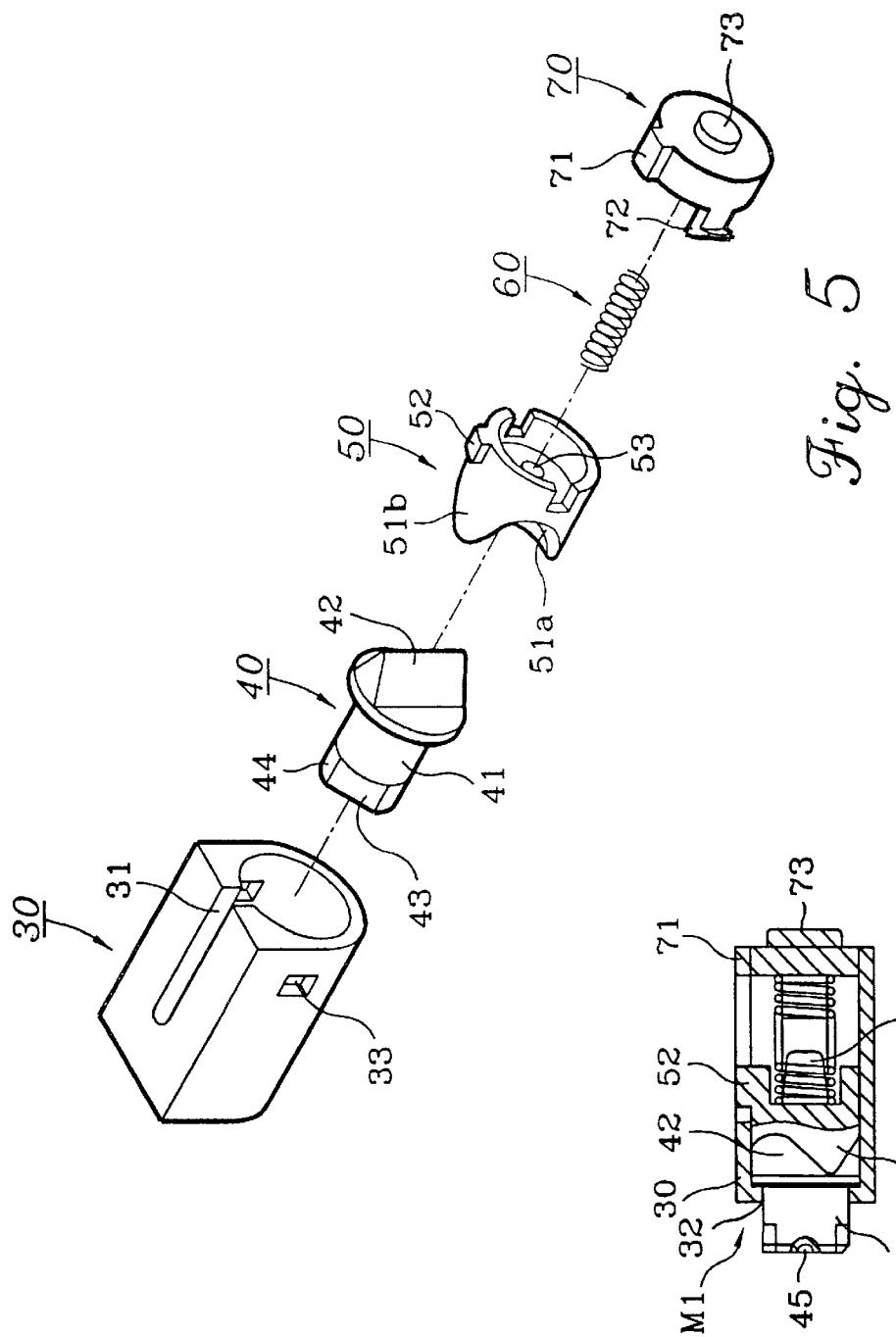

HINGE MECHANISM FOR FOLDABLE ELECTRONIC APPARATUS

CROSS-REFERENCE TO RELATED APPLICATIONS

This application is a continuation-in-part of patent application Ser. No. 08/708,985, entitled HINGE MECHANISM FOR FOLDABLE ELECTRONIC APPARATUS filed in the U.S. Patent & Trademark Office on Sep. 6, 1996, now U.S. Pat. No. 5,697,124.

CLAIM FOR PRIORITY

This application makes reference to, incorporates the same herein, and claims all benefits accruing under 35 U.S.C.§119 from an application entitled BUTTON COVER OPENING/SHUTTING DEVICE IN PORTABLE CELLULAR PHONE earlier filed in the Korean Industrial Property Office on Sep. 19, 1995 and Apr. 24, 1996, and there duly assigned Ser. Nos. 25322/1995 and 9131/1996 respectively by that Office.

BACKGROUND OF THE INVENTION

1. Field of the Invention

The present invention relates to a flip-cover opening/closing device for a foldable electronic apparatus, and more particularly, to a hinge mechanism for a flip-cover of a portable cellular phone which enables one to detach the flip-cover from the phone body upon rotating the flip-cover over a communication angle and applying a force.

2. Description of the Related Art

In a portable cellular phone, since dial button keys and function button keys are disposed on a surface of a body thereof, the buttons can be inadvertently pressed when the phone is carried by a user. To prevent such a malfunction, a button cover, or a flip-cover, is frequently provided to protect the phone body. As the length of the cellular phone is shortened, the transmitting sensitivity is lowered due to loss of transmitted sound volume during calling. Such problems can be overcome by using the button cover to reflect the transmitted sound and thereby improve the quality of the transmission.

In a conventional portable cellular phone having a button cover, two hinge pins and a coil spring positioned therebetween are disposed in a cylindrical hinge arm. The hinge pins, which are made of plastic, have cam surfaces on their outer ends. Metal cam followers are fitted to either side of the phone body do as to respectively contact the cam surfaces of the two hinge pins. The cam surfaces have indented portions and protrusions which interact with the cam followers so that the hinge mechanism either keeps the button cover closed or allows the button cover to remain in a stable and open position at a predetermine angle with respect to the phone body. I have noticed however, that when a user repeatedly opens and shuts the button cover, the cam surfaces of the hinge pins wear out due to the friction between the plastic surfaces of the hinge pins and the metal surfaces of the cam followers. I have also found that when a user applies an excessive force to the button cover, the cover may be detached from the body and the hinge assembly elements are often expelled and lost due to the force of the coil spring. Furthermore, cracks may occur in either the hinge assembly or in the body of the phone due to the excessive force applied to the cover.

Takagi, et al., U.S. Pat. No. 5,111,503, endeavors to provide a Portable Telephone Set with one cover in an effort to eliminate many of the problems noted above. The hinge of Takagi et al is somewhat cumbersome to manufacture and assemble, and due to its dependence upon a set of U-shaped springs, is not especially reliable for long term use.

Subsequently, Takagi, et al. U.S. Pat. No. 5,303,291 designed a PORTABLE TELEPHONE HAVING A DETACHABLE FUNCTIONAL MODULE and Kobayashi, U.S. Pat. No. 5,317,785 designed a HINGE MECHANISM FOR FOLDABLE ELECTRONIC APPARATUS; both designs use hinge mechanisms that are not particularly amenable to either disassembly or replacement of broken or worn parts. Moreover, if the distal ends of the cover serving as hinges become cracked, the entire cover as well as its internal microphone, must be removed and discarded, and a new complete cover installed.

SUMMARY OF THE INVENTION

To solve the above problems, it is an object of the present invention to provide an improved had-held compact telephone.

It is another object to provide a hinge mechanism for a foldable electronic apparatus providing a flip operation structure of a flip-cover coupled with a case body is made in a module and installed at a receiving space and a cam surface and cam follower surface are made of the same material so that the friction therebetween is reduced and performance thereof improves.

It is still another object to provide a hinge mechanism for a button cover in which structural elements are prevented from flying off even when the flip-cover is detached from the case body due to an excessive force applied in opening the flip-cover by using independent flip modules at each receiving space of the case body.

It is yet another object to provide a hinge mechanism of a button cover which can be easily disassembled using a thin pin and then put together and separated when force is forcedly applied, by forming a disassembly groove at a rotation portion of the flip-cover in the case body and an end portion of a hinge shaft.

It is still yet another object of the present invention to provide a hinge mechanism button cover in which cracks on the flip-cover rotation portion or the case are prevented by forming the disassembly groove for performing a tension function at the flip-cover rotation portion when the flip-cover is detached from the case body due to an excessive force applied in opening the flip-cover.

It is further another object of the present invention to provide a hinge mechanism button cover whose life span is prolonged and whose durability is improved by making the hinge shaft and a cam hinge of the same material.

Accordingly, to achieve the above objects, there is provided a housing of an electronic apparatus including a flip-cover opening/closing device which includes: rotation portions positioned in an outward direction of the housing, the rotation portions being detached from the housing upon rotating a flip-cover over a communication angle and applying a force; a pair of necks for converting a rotational movement of the flip-cover into a rectilinear movement upon rotation of the flip-cover over the communication angle, so as to detach a hooking socket of the flip-cover from a hinge shaft of the housing; and at least one tension opening for absorbing the force applied to the hooking socket of the flip-cover upon the detachment of the hooking socket; the flip-cover being detachable from the housing.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings in which like reference symbols indicate the same or similar components, wherein:

FIG. 3 is a cross-sectional view showing a state of operation for a representation of a hypothetical portable cellular telephone constructed according to conventional design practice;

FIG. 4 is an exploded view illustrating a state where a button cover is assembled into the body of a case for a cellular telephone as an embodiment of the present invention;

FIG. 5 is an exploded view showing a flip module constructed as an embodiment of the present invention before being assembled;

FIG. 6 is a cross-sectional view of the flip module constructed as an embodiment of the present invention after being assembled;

DETAILED DESCRIPTION OF THE PREFERRED EMBODIMENT

Figure 1:
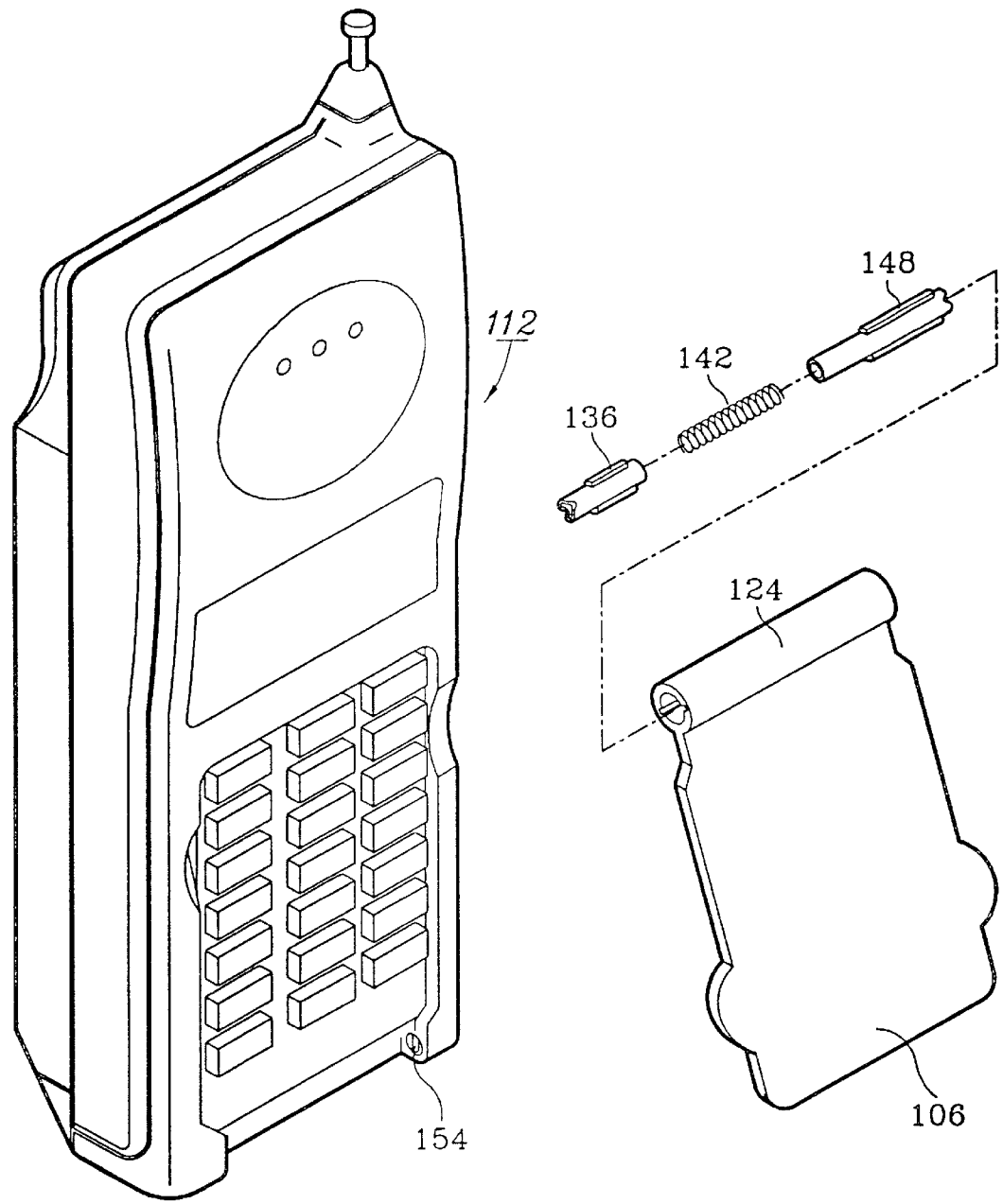
FIG. 1 is an exploded view illustrating a representation of a hypothetical portable cellular phone where a button cover is coupled therewith according to a conventional design practice.

Turning now to the drawings and referring to FIGS. 1, 2A, 2B and 3, the hinge mechanism for a hypothetical button cover in a representation of a hypothetical conventional portable cellular phone will now be described. A conventional hinge assembly is hinge-coupled with a keypad and a cover such as a housing in a cellular phone. The structure of a flip device of a portable cellular phone is as follows.

A hinge assembly for hinge-coupling a flip-cover 106 and a body 112 of a portable wireless phone together forms a pipe-type hinge arm 124 at an end portion of the flip-cover 106. Two individually manufactured hinge pins 136 and 148 and a coil spring 142 disposed between the two hinge pins 136 and 148 are inserted into the pipe-type hinge arm 124. A pin-shaped cam follower 176 formed of metal is fixed to an portion 154 for receiving the hinge pins 136 and 148 in the body 112. The receiving portion is oppositely formed for each hinge pin.

Figure 2A:
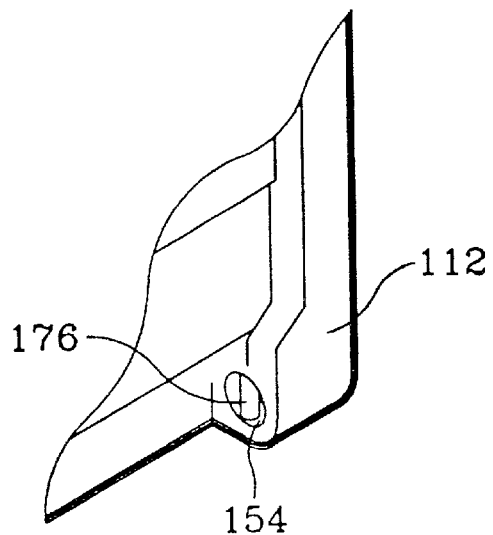
FIG. 2A is a perspective view illustrating a cam of a case body of the representation of a hypothetical portable cellular phone according to the conventional design practice.
Figure 2B:
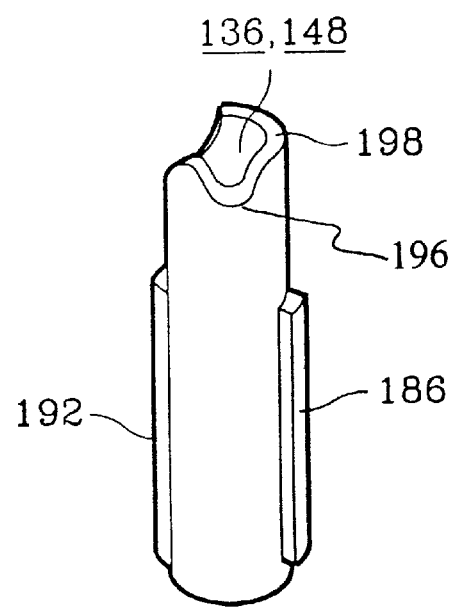
FIG. 2B is a perspective view illustrating a hinge pin of the representation of a hypothetical portable cellular phone according to the conventional design practice.

The coil spring 142 is inserted to elastically function between the hinge pins 136 and 148. As shown in FIGS. 2A–2B, the cam follower 176 is fixed to a housing such that a cam surface of the hinge pins 136 and 148 can surface-contact the cam follower 176. At one end of each hinge pin 136 and 148, a protrusion 198 and an indent 196 are formed and key members 186 and 192 protrude in a lengthwise direction at the outer circumferential surface of each of the hinge pins 136 and 148. Key slots 130 are formed opposingly at the inner circumferential surface of the hinge arm 124 so that the key members 186 and 192 can move together in a horizontal direction.

As shown in FIG. 3, when the flip-cover 106 is rotated by a user by applying a predetermined force to make a phone call, a cam surface of each hinge pin 136 and 148 contacts the cam follower 176 being engaged with each other due to an elastic force of the coil spring 142 during rotating. When there is no rotational moment, the flip-cover 106 is positioned still at either opening or shutting position by the hinge pins 136 and 148 to which the elastic force by the coil spring 142 is applied.

That is, the indent 196 and the protrusion 198 are formed at both ends of the hinge pins 136 and 148, and the key members 186 and 192 are protrude at the outer circumferential surface of each of the hinge pins 136 and 148 so that the key members 186 and 192 can horizontally move along the key slots 130 formed at the inner circumferential surface of the hinge arm 124. Accordingly, the cam surface of the hinge pins 136 and 148 contacts the cam follower 176 so that the opening and shutting positions of the cover 106 are maintained.

However, when a user repeats opening and shutting actions of the flip-cover 106 for communications in a state where the hinge assembly inserted into the hinge arm 124 of the flip-cover 106 is installed in the body 112 of a portable cellular phone, the cam surfaces of the hinge pins wear out due to the friction between members of the heterogeneous material, i.e., the cam surface of the plastic hinge pins 136 and 148 and that of the metal cam follower 176.

Also, when a user applies an excessive force to the cover 106, the flip-cover 106 is detached from the body 112 due to the coil spring 142 so that the hinge assembly elements are often lost. Further, in such a case, cracks occur on the body 112 where the cam follower 176 is formed or both ends of the hinge arm 124. It is cumbersome to change the flip-cover or the entire body of the cellular phone.

As shown in FIGS. 4 and 6, the flip modules M1 and M2 installed in a receiving space of a case body 80 are each comprised of a hinge housing 30, a hinge shaft 40 having a shaft 41 at one end thereof and a protrusion 42 at the other end thereof and being inserted into the hinge housing 30, a cam hinge 50 having an indent 51a and a protrusion 51b at the same one end thereof so that the protrusion 42 is engaged with the indent 51a, a hinge cover 70 having a hooking protrusion 72 to be coupled with the hinge housing 30, and a coil spring 60 installed between the cam hinge 50 and the hinge cover 70.

The one side of the hinge housing 30 is a semi-circular surface and the other side thereof is a plane so that both portions are assembled to have a different shape from each other considering the sharing of parts for the left and right sides in view of an assembler and the convenience for assembly.

A guide slit 31 is formed in a lengthwise direction on the upper portion of the hinge housing 30 and hooking hole 33 are formed on both sides thereof. Also, a hinge opening 32 is formed on the other end thereof.

The hinge shaft 40 inserted into the hinge housing 30 has the shaft 41 and the protrusion 42 respectively at one and the other ends thereof. Plane surface 43 are formed by slicing off each side portion of an end 44 of the shaft 41 so as to form a D-shaped cross-section. The angle made by the plane 43 of the hinge shaft 40 and the protrusion 42 is set considering a communication angle. Also, a disassembly groove 45 is formed at the central surface of the end 44 of the shaft 41 to facilitate the fixing of a thin pin in disassembling the flip module. Further, the length in a lengthwise direction of the plane having both sides cut in a D-shaped cross-section is determined according to the hooking amount when the end portion of the hinge shaft is inserted into the hooking portion of the flip-cover. That is, by adjusting the above hooking amount within 1–2.5 mm, the flip-cover does not easily detached from the case body when assembled and cracks do not occur at around the rotation portion of the flip-cover when the flip-cover is forcedly opened.

The indent 51a is formed at the center portion of one end of the cam hinge 50 so that the sliding surface-contact of the protrusion 42 is possible. Accordingly, the protrusion 51a is formed on each side thereof. At the upper portion of the cam hinge 50, a cam hinge protrusion 52 protrudes so that the cam hinge can be horizontally moved along the guide slit 31 of the hinge housing 30, and a spring fixing protrusion 53 is formed on the other side thereof.

On both sides of the hinge cover 70, there hooking protrusions 72 are provided so as to be hooked by the hooking hole 33 of the hinge housing 30. At the upper portion of the hinge cover 70, a hinge cover protrusion 71 protrudes so as to be inserted into the guide slit 31 and a fixing protrusion 73 to be installed fast to the receiving space of the case body is formed on the other side thereof. The coil spring 60 installed between the cam hinge 50 and the hinge cover 70 operates elastically with respect to the cam hinge 50 when being completely assembled into the hinge housing 30.

As shown in FIGS. 7 and 8A–8C, to firmly fix the flip modules M1 and M2 to the case body 80, each supporting wall 82 and each fixing wall 83 perpendicular to the supporting wall 82 are formed and an insertion hole 81b to receive the fixing protrusion 73 of the hinge cover 70 is formed in each fixing wall 83.

The shaft 41 of the hinge shaft 40 is inserted into the hinge opening 32 of the hinge housing 30, and then, the hinge shaft 40 is inserted into the hinge housing 30 in a direction of engaging the protrusion 51b and the indent 51a of the cam hinge 50 with the protrusion 42 of the hinge shaft 40. Next, after the coil spring 60 is fixed to the spring fixing protrusion 53, the hooking protrusion 72 is inserted into the hooking groove 33 of the hinge housing 30 by applying a predetermined force while the coil spring 60 is fixed to the fixing protrusion of the hinge cover 70. Thus, the flip modules M1 and M2 are completely assembled.

Figure 7:
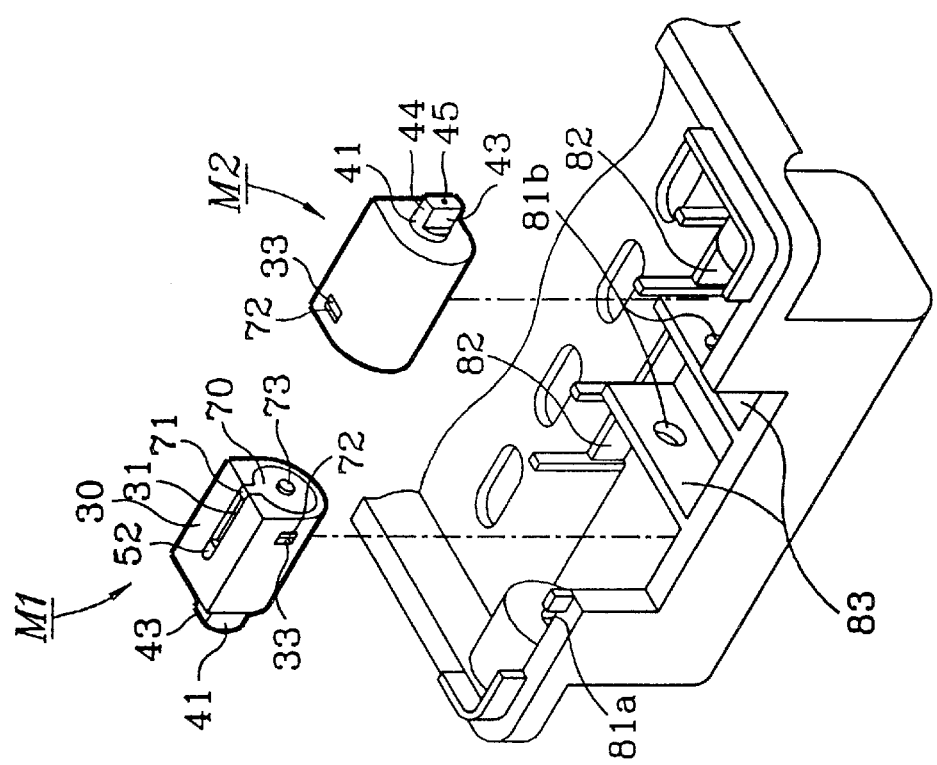
FIG. 7 is a perspective view illustrating a state where each flip module constructed as an embodiment of the present invention is installed a receiving space of the case body.
Figure 8A:
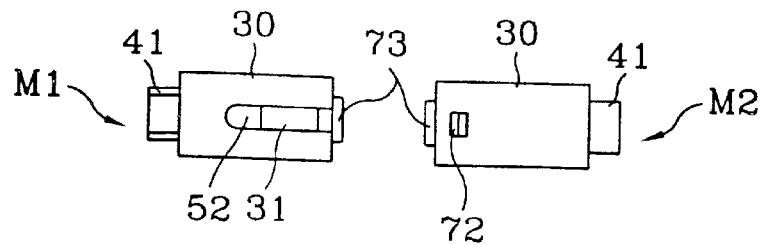
FIGS. 8A and 8C together form a plan view showing a state where the flip module constructed as an embodiment of the present invention is installed the case body.
Figure 8B:
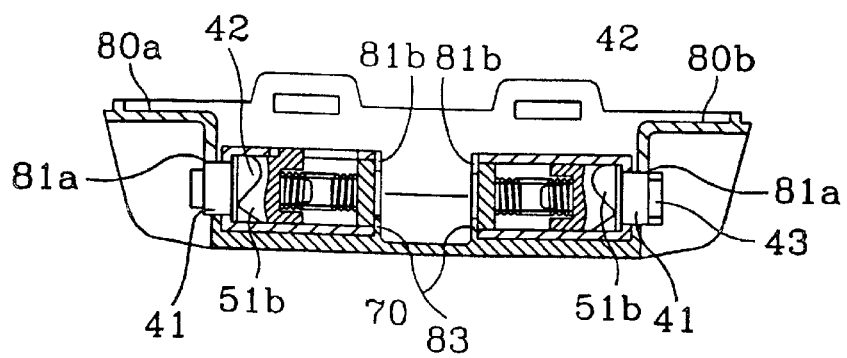
FIG. 8B is a cross-sectional view of the flip module constructed as an embodiment of the present invention being installed the case body.
Figure 8C:
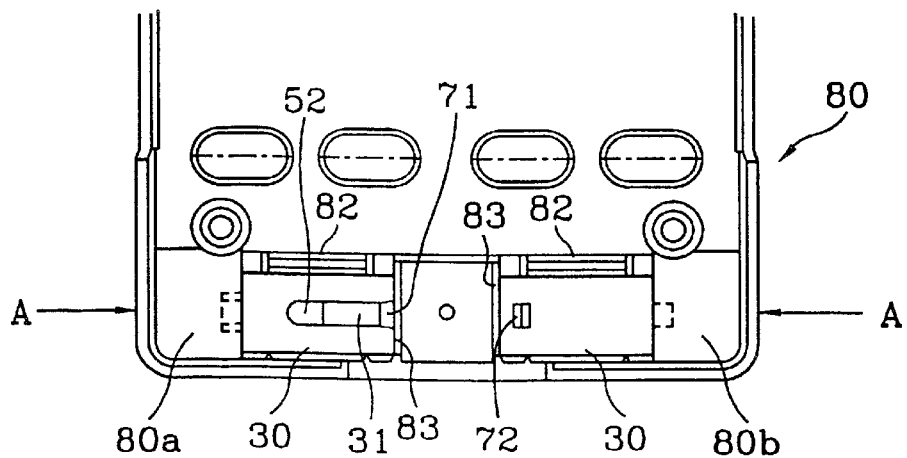
Figure 9A:
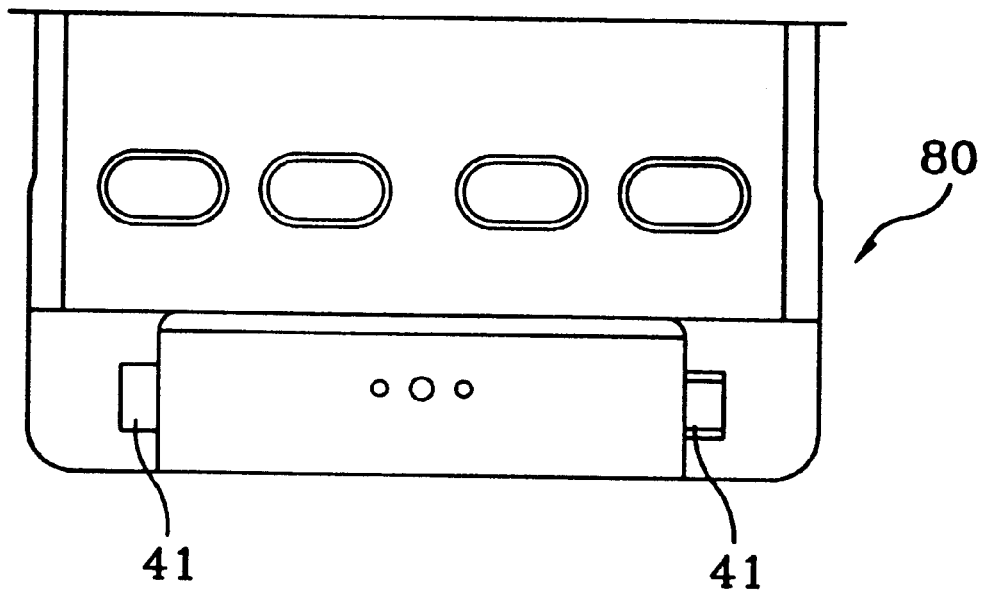
FIG. 9A is a side view of a portable cellular phone showing a state where the flip module constructed as an embodiment of the present invention is installed the case body.
Figure 9B:
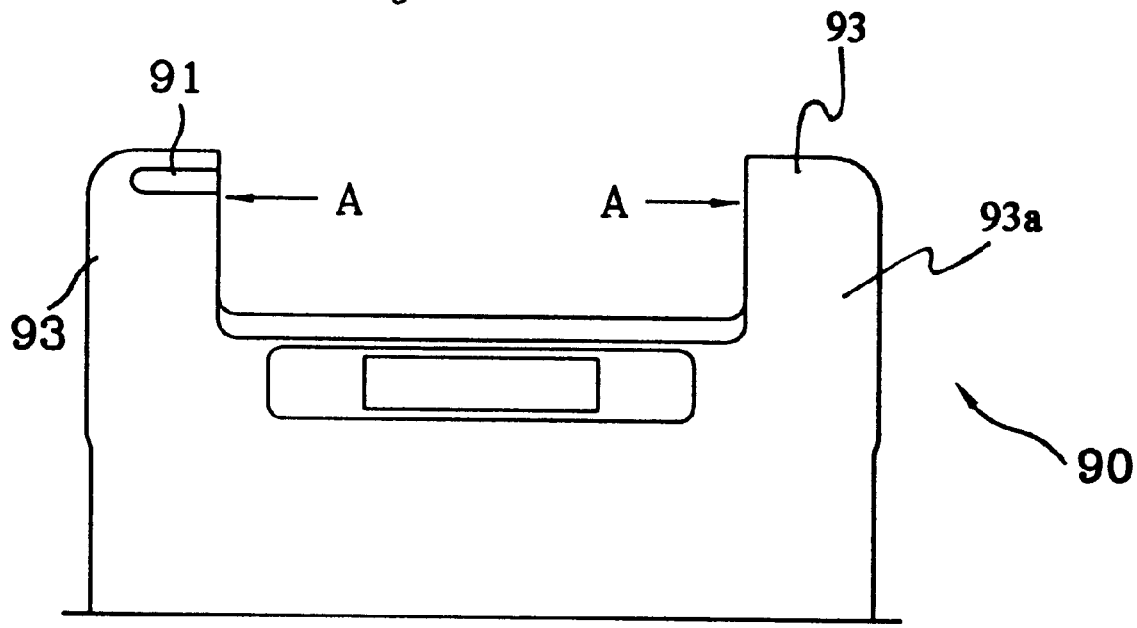
FIGS. 9B through 9D together form a side view illustrating a flip-cover showing details viewed from opposite sides along the directions indicated by arrows A.
Figure 9C:
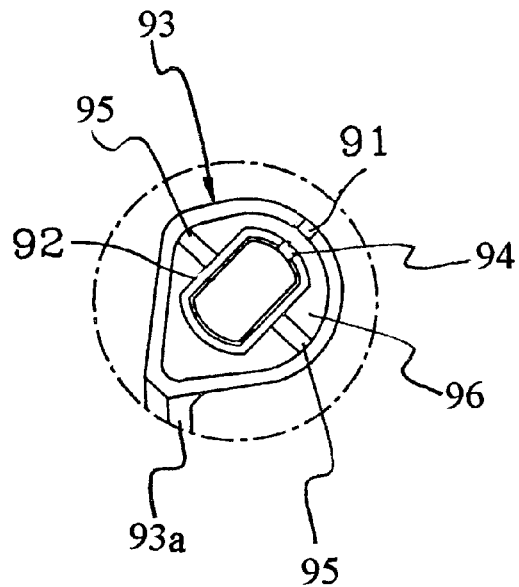
Figure 9D:
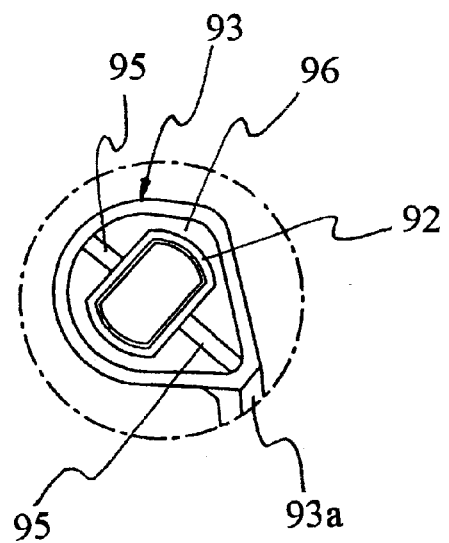

To install the assembled flip modules M1 and M2 in the case body 80, the fixing protrusion 73 of the flip module M1 is first inserted into the insertion hole 81b of the fixing wall 83. Then, the shaft 41 of the flip module is inserted into the hinge opening 32 while being pushed inwardly by a predetermined force. Thus, the flip modules M1 and M2 are installed in the case body 80. In doing so, as shown in FIG. 7, the flip module M1 is installed so as to have the guide slit 31 face upward and the other flip module M2 is installed to have the guide slit 31 face the inside of the case body for the opening and shutting angle of the flip-cover 90. A discussion of the installation of the flip module M2 to the case body after setting the installation angle has been omitted since the installation thereof is the same as that of the flip module M1.

The installation of each flip-cover M1 and M2 at respective receiving space at a rectangular angle is because, since being elastically supported by the coil spring 60, the cam hinge 50 can horizontally move within limit and thus restoring force, occurring when the horizontal moving distance changes according to the phase of the protrusion 51b of the cam hinge 50 directly receiving the restoration force of the spring 60 during the rotation of the hinge shaft 40, i.e., the rotation of the flip-cover 90, provides moment for the rotation of the button cover.

Thus, an opening angle (about 135°) and shutting angle (0°) must be maintained during opening and shutting of the button cover.

With regard to the construction of the flip-cover 90 for disassembly prior to describing the disassembly process of the flip-module, as shown in FIGS. 9A to 9D, the flip-cover 90 is constructed with rotation portions 93 for preventing cracks of the flip-cover 90, a neck 93a positioned at the rotation portions 93, and a tension opening 94 for receiving force applied to a hooking socket 92 formed at the interior of the rotation portions 93 in the case that excessive force is applied to the flip-cover 90 installed at the case body 80 by a user upon the flip-cover 90 is open to thereby be detached or is forcibly or intentionally detached.

Further, the flip-cover 90 additionally includes a space 96 disposed between the rotation portions 93, for absorbing the force and the hooking socket 92, and a supportable rib 95 for preventing variation of the hooking socket 92.

When a force is applied to the rotation portions 93 with rotation over a communication angle, the rotation portions 93 are positioned in an outward direction of the body hosing to be capable of being detached from the body housing. Also upon rotating the flip-cover 90 over a commination angle, the neck 93a converts the rotation movement of the flip-cover 90 into a rectilinear movement to thereby detach the hooking socket 92 of the flip-cover 90 from the hinge shaft of the case body, and the tension opening 94 receives the force applied to the hooking socket 92 of the flip-cover 90 during detachment. Furthermore, a disassembly groove 91 is formed at the rotation portions 93.

There are two methods of disassembling the flip-cover 90 from the case body 80. One method is to detach the flip-cover 90 from the case body 80 by inserting a thin pin into the disassembly groove 91 so as to enable the repair of the phone. Another method is to detach the flip-cover 90 therefrom by intentionally applying a force to the flip-cover 90 over the communication angle.

The latter method is capable of being utilized because of the flexibility of the plastic material of the flip-cover 90. When intentionally applying a force to the flip-cover 90 over the communication angle, the rotation portions 93 of the flip-cover 90 separate wide in an outward director with the neck 93a, and then are detached from the hinge shaft owing to an opening 94 of the hooking groove 92, thereby detaching the flip-cover 90 from the case body 80. In this instance, the hooking groove 92 can move within the space 96, so that an impact caused by forcibly applying the force during the communication can be absorbed. When continuously applying the force, the flip-cover 90 is completely detached from the case body 80. That is, the end portion 41, of the hinge shaft coupled to the hooking socket 92 escapes from the case body 80.

After disassembling of the flip-cover 90, the thin pin is inserted into the disassembly groove 91 formed at the hinge shaft 40 and the pin is pushed in the inward direction with a predetermined force. The hinge shaft 40 being elastically supported by the coil spring 60 moves inwardly. Then, when the end portion 41 of the hinge shaft is lifted up, the fixing protrusion 73 of the flip module M1 escapes from the insertion hole 81b of the fixing wall 83 so that the flip module M1 is detached from the receiving space of the case body.

Also, when the disassembly groove 45 of the other flip module M2 is lifted up by the thin pin in the same way, the fixing protrusion 73 of the flip module M2 escapes from the insertion hole 81b of the fixing wall 83 so that the flip module M2 is detached from the receiving space of the case body 80.

As described above, to disassemble the flip modules M1 and M2 being detached from the case body 80, the hooking protrusion 72 of the hinge cover 70 fixed to the hooking hole 33 of the hinge housing 30 is pushed inward and thus the hinge cover 70 is pushed outward by the coil spring 60 installed inside the hinge housing 30.

When the flip-cover 90 is open for communication, the cam hinge 50 contacting the protrusion 42 of the hinge shaft 40 retreats along the slope of the indent 51a to reach the top of the protrusion 51b (the cam hinge of the flip module moves horizontally). Then, the cam hinge 50 slide down along the other slop at the other side. At this stage, the flip-cover 90 stops such action at a point where the protrusion 42 is engaged with the indent 51a of the cam hinge by the restoration force of the coil spring 60 so that an available angle for communication (about 135°) is maintained.

On the contrary, when the flip-cover 90 is shut, the cam hinge 50 contacting the protrusion 42 of the hinge shaft 40 at the indent 51a slides along the slope of the indent 51a to reach the top of the protrusion 51b. Then, the cam hinge 50 slide down along the other slop at the other side to thereby shut. At this stage, the flip-cover 90 continuously receives further rotatably shutting force by the restoration force of the spring 60 of the flip module.

Since the guide slit 31 is formed at the hinge housing 30 in the flip module and the protrusion is formed at the cam hinge 50, the cam hinge moves horizontally during the rotation of the cover.

As described above, in the button cover opening/shutting device of the present invention, since the independently manufactured flip modules are installed in the receiving space of the case body, the attaching and detaching of the flip-cover and the flip module is easy. Also, by forming the disassembly groove, the disassembly and assembly process is facilitated and cracks on the flip-cover and the loss of parts occurring when the flip-cover is detached can be prevented. Further, by installing the flip modules on both sides of the case body and forming the flip elements of the same material, reduced friction occurs and concurrently the performance thereof improves to thereby provide improved reliability.

It should be understood that the present invention is not limited to the particular embodiment disclosed herein as the best mode contemplated for carrying out the present invention, but rather that the present invention is not limited to the specific embodiments described in this specification except as defined in the appended claims.

What is claimed is:

1. A housing of an electronic apparatus including a flip-cover opening/closing device comprising:

rotation portions positioned in an outward direction of the housing, the rotation portions being detached from said housing upon rotating a flip-cover over a communication angle and applying a force;

a pair of necks for converting a rotational movement of said flip-cover along a rotational axis into a rectilinear movement parallel to said rotational axis upon rotation of said flip-cover over the communication angle, so as to detach a hooking socket of said flip-cover from a hinge shaft of the housing; and at least one tension opening for absorbing the force applied to said hooking socket of said flip-cover upon the detachment of said hooking socket, whereby said flip-cover is detachable from said housing.

2. The housing as claimed in claim 1, said rotation portions comprising a space disposed therebetween for reducing the force on said hooking socket caused when detaching said rotation portions from said hooking socket.

3. The housing as claimed in claim 1, further comprising:
at least one supportable rib, disposed between said rotation portions and said hooking socket for preventing variation of said hooking socket caused upon detaching said flip-cover.

4. The housing as claimed in claim 1, further comprising:
at least one disassembly groove, formed at said rotation portions, for detaching said flip-cover from the case body.

5. The housing as claimed in claim 1, further comprising:
a plurality of supportable ribs disposed between said rotation portions and said hooking groove for preventing variation of said hooking groove caused upon detaching said flip-cover.

6. The housing as claimed in claim 2, further comprising:
at least one supportable rib, disposed between said rotation portions and said hooking socket for preventing variation of said hooking socket caused upon detaching said flip-cover.

7. The housing as claimed in claim 2, further comprising:
at least one disassembly groove, formed at said rotation portions, for detaching said flip-cover from the case body.

8. The housing as claimed in claim 3, further comprising:
at least one disassembly groove, formed at said rotation portions, for detaching said flip-cover from the case body.

9. The housing as claimed in claim 6, further comprising:
at least one disassembly groove, formed at said rotation portions, for detaching said flip-cover from the case body.

10. The housing as claimed in claim 2, further comprising:
a plurality of supportable ribs disposed between said rotation portions and said hooking groove for preventing variation of said hooking groove caused upon detaching said flip-cover.

11. The housing as claimed in claim 3, further comprising:
a plurality of supportable ribs disposed between said rotation portions and said hooking groove for preventing variation of said hooking groove caused upon detaching said flip-cover.

12. The housing as claimed in claim 4, further comprising:
a plurality of supportable ribs disposed between said rotation portions and said hooking groove for preventing variation of said hooking groove caused upon detaching said flip-cover.

13. The housing as claimed in claim 6, further comprising:
a plurality of supportable ribs disposed between said rotation portions and said hooking groove for preventing variation of said hooking groove caused upon detaching said flip-cover.

14. The housing as claimed in claim 7, further comprising:

a plurality of supportable ribs disposed between said rotation portions and said hooking groove for preventing variation of said hooking groove caused upon detaching said flip-cover.

15. The housing as claimed in claim 8, further comprising:

a plurality of supportable ribs disposed between said rotation portions and said hooking groove for preventing variation of said hooking groove caused upon detaching said flip-cover.

16. The housing as claimed in claim 9, further comprising:

a plurality of supportable ribs disposed between said rotation portions and said hooking groove for preventing variation of said hooking groove caused upon detaching said flip-cover.

\* \* \* \* \*